United States Patent
Costa et al.

(10) Patent No.: US 7,628,852 B2
(45) Date of Patent: Dec. 8, 2009

(54) HIGH-RESISTANCE POURABLE MORTARS WITH HIGH FLUIDITY

(75) Inventors: Umberto Costa, Bergamo (IT); Roberto Cucitore, Bergamo (IT)

(73) Assignee: Italcementi S.p.A., Bergamo (IT)

( * ) Notice: Subject to any disclaimer, the term of this patent is extended or adjusted under 35 U.S.C. 154(b) by 377 days.

(21) Appl. No.: 10/589,013

(22) PCT Filed: Feb. 9, 2005

(86) PCT No.: PCT/IB2005/000319

§ 371 (c)(1),
(2), (4) Date: Aug. 10, 2006

(87) PCT Pub. No.: WO2005/080289

PCT Pub. Date: Sep. 1, 2005

(65) Prior Publication Data

US 2007/0169669 A1    Jul. 26, 2007

(30) Foreign Application Priority Data

Feb. 12, 2004    (IT)    ............ MI2004A0226

(51) Int. Cl.
*C04B 28/00*    (2006.01)
(52) U.S. Cl. .............. 106/713; 106/737; 264/333
(58) Field of Classification Search ............ 106/713, 106/737; 264/333
See application file for complete search history.

(56) References Cited

U.S. PATENT DOCUMENTS 6,802,898 B1    10/2004    Liskowitz et al. ........... 106/705
7,101,430 B1 *    9/2006    Pike et al. ................ 106/705

FOREIGN PATENT DOCUMENTS

DE    197 04 066 A1    8/1998

OTHER PUBLICATIONS

International Search Report dated Oct. 20, 2005 from PCT/IB2005/000319.

* cited by examiner

*Primary Examiner*—Paul Marcantoni
(74) *Attorney, Agent, or Firm*—Ohlandt, Greeley, Ruggiero & Perle, L.L.P.

(57) ABSTRACT

Described herein are new cementitious mortars with a high degree of fluidity and high final resistance. The mortars contain water, a hydraulic binder, a pozzolanic substance (finely ground slag), a fluidifier and/or superfluidifier, a setting regulator, and aggregates having a specific granulometric distribution. The aggregates are made up of three highly monogranular fractions (A, B, C), and a fourth fraction (D) having a low monogranularity.

The new mortars described herein have values of fluidity higher, by approximately 70%, than those of mortars produced with traditional aggregates. The increase in fluidity is obtained without increasing the water/cement ratio and without increasing the amount of fluidifiers/superfluidifiers present.

The mortars produced according to the invention may be used to advantage in all applications in which it is required to associate a high degree of fluidity and a high final mechanical resistance, both in compression and in flexure.

19 Claims, 1 Drawing Sheet

HIGH-RESISTANCE POURABLE MORTARS WITH HIGH FLUIDITY

FIELD OF THE INVENTION

The present invention relates to the field of cementitious compositions. Described herein are compositions suitable for forming cementitious mortars having a high degree of fluidity and high final resistance.

PRIOR ART

Pourable mortars are liquid compositions characterized by a high degree of fluidity. They are used in the cement sector for specific applications in which a very fluid mix is required, which is able to reach crevices and narrow spaces to fill them in a homogeneous way and solidify therein. Examples of said applications are the recovery of deteriorated building works, consolidation of rock formations, structural reinforcement, injection in the conduits of tendons, immobilization of toxic-noxious refuse (e.g., asbestos), and the production of cementitious products for pouring in moulds.

Pourable mortars in general consist of hydraulic binders, aggregates having a diameter up to 4 mm, water, and possibly, added substances and additives. Amongst the additives there may be listed: fludifiers, superfluidifiers, setting correctors, substances that facilitate adhesion to the substrate, air-entraining agents, expansive agents, etc.

Examples of pourable cementitious mortars known to the state of the art are "Mapegrout colabile" (manufactured by Mapei S.p.A.) and "Malta antiritiro reoplastica autolivellante" (self-levelling rheoplastic anti-shrink mortar) (manufactured by Siriobeton A.C); Macflow Rheomac 200 (manufactured by MAC S.p.A.) is marketed as specific binder for the manufacture of pourable mortars. The performance of the mortars in the fresh state is evaluated using testing methods for measuring spreading by means of a vibrating table (UNI 7044-72) or for determining consistency by means of a funnel groove (UNI 8997). Both methods provide an indication of consistency through the measurement of a dimension characteristic of the area occupied by a pre-set volume of mortar on a horizontal plane and in defined conditions of testing.

The high degree of fluidity of pourable mortars, albeit desirable for the applications referred to above, can also present certain disadvantages; for example, in the case of consolidation of vertical or inclined surfaces, the mortar, once applied, tends to be dispersed away from the site of application before hardening. In the case of recovery of deteriorated building works or in the case of products made by moulding, there are frequent cases in which a high final mechanical resistance is required (i.e., obtained after 28 days). It would thus be useful to increase the final resistance of the mortar, for example by reducing the water/cement ratio. However, said operation tends to reduce the fluidity of the mortar in the fresh state. Combining the reduction of the water/cement ratio with the appropriate addition of fluidifier or superfluidifier additives involves an increase in the viscosity of the mortar in the fluid state and an excessive increase in the setting and hardening times, with consequent delay of removal from the moulds of the mortar from the moulds.

There is therefore the need to increase the final resistance of pourable mortars, without this having the repercussion of an undesired reduction in fluidity of the product, and at the same time, conserving the normal times of removal of the products from the moulds.

In addition, the need to obtain extremely fluid mortars, without resorting to large amounts of fluidifiers/superfluidifiers is motivated by the wish to contain the environmental impact of said products and to contain the cost of the cementitious mix, since said preparations have a considerable incidence on the total cost of the mix.

SUMMARY

The present applicant has surprisingly found that by mixing with water a hydraulic binder, a pozzolanic substance (finely ground slag), a fluidifier and/or superfluidifier, a setting regulator, and aggregates having a specific granulometric distribution, mortars are obtained that are characterized by a high degree of fluidity and high final mechanical resistance.

The aggregates used in the invention are made up, for 75-95 wt %, of the combination of three fractions of highly monogranular aggregates (A, B, C), and, for the remaining 5-25 wt %, of a fourth fraction of low-monogranularity aggregate (D).

The characteristic grain diameters of the fractions A, B, C satisfy specific numeric ratios, namely:
 the ratio between the characteristic grain diameters of the coarsest fraction (C) and of the intermediate fraction (B) and
 the ratio between the characteristic grain diameters of the intermediate fraction (B) and of the finest fraction (A)
are comprised between 2.2 and 3.2.

With respect to the weight of the total aggregates (A+B+C+D), Fraction A represents at least 40 wt %.

The new mortars containing the aforesaid components have values of fluidity higher by approximately 70% than those of mortars produced with traditional aggregates. The increase in fluidity is obtained without increasing the water/cement ratio and without increasing the amount of fluidifiers/superfluidifiers present.

The mortars produced according to the invention may be used to advantage in all applications in which it is required to associate a high degree of fluidity and a high final mechanical resistance, both in compression and in flexure. In particular, it is possible to produce products with walls of small thickness.

DETAILED DESCRIPTION OF THE INVENTION

Figure 1:
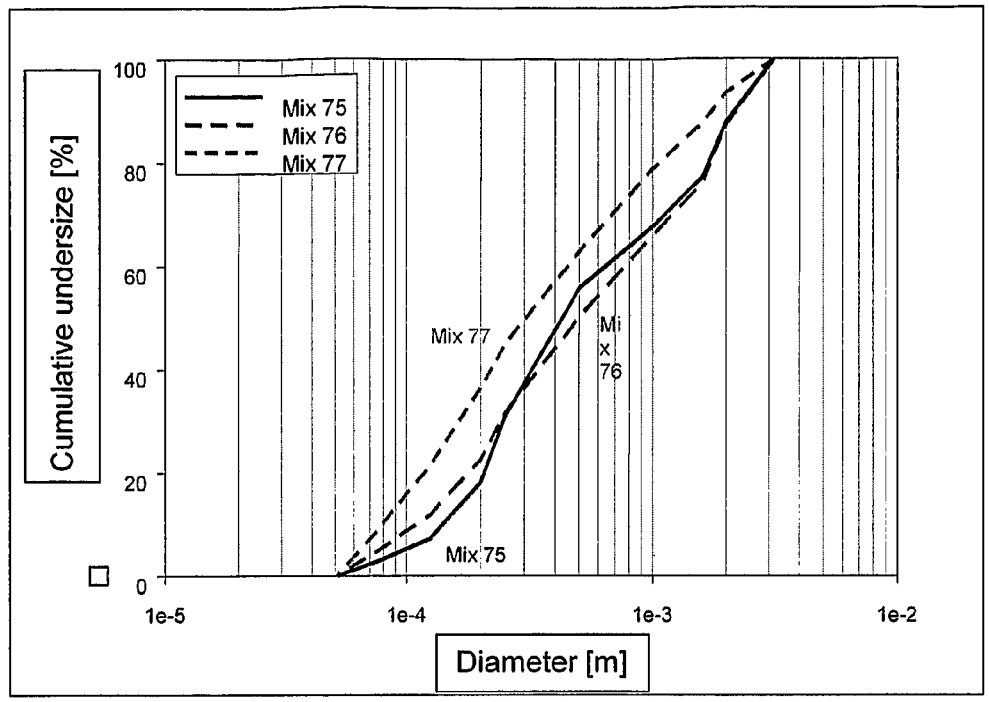
FIG. 1: granulometric distribution of a traditional type of the aggregates used in Example 1

A first subject of the present invention is a dry premix, useful for forming pourable mortars with a high degree of fluidity and a high development of resistance, comprising a hydraulic binder, finely ground slag, a fluidifier and/or superfluidifier, a setting regulator, and aggregates.

The aggregates are, from the mineralogical standpoint, the aggregates commonly used in the preparation of concretes (e.g., sand) as classified in the standard UNI 8520. However, said aggregates are not used as such in a coarse form, but are previously divided on the basis of their grain size.

In the premix compositions in question the aggregate is made up, for 75-95 wt % (preferably for 85-92 wt %, or more preferably for 90 wt %), of the combination of three fractions of aggregates (A, B, C), which are highly monogranular and each of which has a characteristic grain diameter, where said diameter increases from A to B to C. The remaining aggregate (5-25 wt %, preferably 8-15 wt %, or more preferably still 10 wt %) consists of a fourth fraction (D) having a low monogranularity, i.e., a low uniformity of grain diameter.

By "characteristic grain diameter" of a given fraction of aggregates (herein defined also as $X_0$) is meant the mesh opening [expressed in mm] of the screen for which the cumulative undersize ($P_c$), for that given fraction, is equal to 63.2%.

The characteristic grain diameters $X_0$ of the three fractions A, B, and C must satisfy given ratios; namely, the ratio between the value $X_0$ of the fraction with larger characteristic diameter and the value $X_0$ of the fraction of immediately smaller diameter must always be comprised between 2.2 and 3.2 (preferably between 2.5 and 3.0). Consequently, designating by A the fraction having the smallest characteristic diameter, by C the fraction having the largest characteristic diameter, and by B the intermediate fraction, the ratios between the characteristic grain diameters ($X_0$) of the three fractions satisfy the following relations:

$X_{0C}/X_{0B}$ comprised between 2.2 and 3.2

$X_{0B}/X_{0A}$ comprised between 2.2 and 3.2.

For the purposes of the invention, it is moreover important that, within each fraction A, B, and C, there should be a small variation in diameter with respect to the characteristic value $X_0$ of the fraction itself: in fact, the effectiveness of the invention increases, the more these fractions tend to be homogeneous in diameter, i.e., with high monogranularity. Monogranularity is conveniently expressed by the parameter n. The parameter n is calculated by means of the RRSB equation[1] (DIN 66145):

$$P_c = 100 \left[ 1 - e^{-\left(\frac{x}{x_0}\right)^n} \right]$$

where:

$P_c$=cumulative undersize [%];

x=mesh opening of the screen [expressed in mm];

$x_0$=characteristic grain diameter as defined previously n form parameter of the granulometric distribution.

In particular, the RRSB equation is used, applying the least-squares algorithm, to interpolate the granulometric distribution determined experimentally and assuming $X_0$ and n as interpolation parameters. The resulting values of $X_0$ and n, for a given distribution, are assumed as distinctive of said distribution. In particular, the parameter n is an index of the quantity of particles that, in a given granulometric distribution, are characterized by values of diameters different from $X_0$. In particular, as n increases, the number of particles having a diameter other than $X_0$ decreases and, consequently, the distribution tends to be monogranular, with a diameter tending to $X_0$.

In the present invention it is important for the parameter n to be greater than or equal to 4.0: said value indicates fractions which, for the purposes of the present invention, are considered "high-monogranularity" ones.

The remaining fraction D of aggregate is characterized by a low uniformity of diameter (i.e., a low monogranularity); with reference to the parameter n defined above, by "low monogranularity" is meant values of n lower than 2.5, e.g., between 0.2 and 2.

It is moreover necessary for the monogranular fraction A, i.e., the one with the lowest characteristic grain diameter between A, B, and C, to represent at least 40 wt % of the total aggregates, i.e., of the sum of A+B+C+D.

The percentage incidence of the fractions B and C is not of determining importance for the purposes of the invention; however, it is preferable for each fraction B and C to represent at least 10 wt % of the total of A+B+C.

According to a preferred embodiment, the division in weight percentage of the three fractions A, B, C, with respect to their sum, is the following:

Fraction A: 50 wt %-70 wt %, preferably 55 wt %-65 wt %;
Fraction B: 10 wt %-20 wt %, preferably 12%-18%;
Fraction C: 18%-32%, preferably 21%-29%.

As regards the absolute value of $X_0$ for the fractions A, B, C, useful and non-limiting ranges of reference are:

Fraction A: 0.2-0.4 mm
Fraction B: 0.6-0.8 mm
Fraction C: 1.6-2.4 mm

However, any fraction with characteristic grain diameter lower than 4 mm may be used in the invention provided that the ratio between the characteristic grain diameters ($X_{0C}/X_{0B}$) and ($X_{0B}/X_{0A}$) is, as mentioned previously, always comprised between 2.2 and 3.2. The value of $X_0$ for the fraction D, which is not of determining importance for the purposes of the invention, is preferably comprised between 0.1 and 0.3 mm.

With respect to the weight of the total dry composition, the aggregates are incorporated in weight percentages preferably comprised between 40 wt % and 60 wt %, preferably between 45 wt % and 55 wt %.

The hydraulic binder is incorporated in the compositions of the invention in weight percentages, with respect to the total dry mix, preferably comprised between 35 wt % and 45 wt %, more preferably between 37% and 42%.

The hydraulic binder may be any ordinary cement, as described according to UNI EN 197-1, for example Portland cement (CEM I). The use of an ordinary cement is not, however, to be understood as exclusive: should the aim be in fact to obtain mortars with additional special characteristics, it is possible to replace or mix the ordinary cement with a cement capable of adding said characteristics (e.g., if the aim is to obtain a pourable mortar having photocatalytic effects it is possible to use a photocatalytic cement, i.e., one containing a photocatalytic substance incorporated in bulk, e.g., titanium dioxide).

The finely ground slag is incorporated in a weight percentage, with respect to the total dry mix, preferably comprised between 0.1 wt % and 20 wt %, e.g., between 5 wt % and 15 wt %. The slag may be any blast-furnace slag; by "finely ground" is meant a slag characterized by a Blaine fineness higher than 5500 $cm^2/g$ (determined in accordance with UNI EN 196-6). To the slag as defined above there can possibly be added smaller amounts of other substances of a pozzolanic nature (Added substances of Type II according to UNI EN 206), e.g., silica smoke, natural pozzolan, fly ash, etc.

The binder/aggregates weight ratio, including in the calculation of the binder also the slag and the possible pozzolanic added substances, is preferably comprised between 0.75 and 1.1, more preferably between 0.90 and 1.05.

The fluidifiers/superfluidifiers are used in weight percentages comprised between 0.2 wt % and 4 wt % with respect to the weight of the binder. Examples of these additives are the compounds of a melaminic, naphthalenic, or acrylic type commonly used in cementitious compositions. They may be used individually or mixed together in two or more. The fluidifiers/superfluidifiers produced may be indifferently added to the starting dry premix or may be added mixed with water at the moment of preparation of the mortar. The setting regulators are used in weight percentages comprised between 0.01 wt % and 0.4 wt % with respect to the total weight of the binder. By way of non-limiting example, among the setting regulators there may be listed: citric acid, boric acid and tartaric acid.

In addition to the aforesaid components, the composition forming the subject of the present invention may contain various additives to enable fine adaptation of the characteristics of the cement to the specific application required. Examples of said additives may be: waterproofing agents, organic resins, expansive agents, air-entraining agents, etc. Said products are useful but not indispensable for the purposes of the invention.

The compositions identified above are mixed with water to obtain cementitious mortars with low viscosity and high final mechanical resistance. Said mortars form a further subject of the present invention.

The ratio of mixing with water can vary widely: non-limiting ranges of reference are comprised between 0.26 and 0.32, preferably between 0.27 and 0.29. By "ratio of mixing with water" or "water/binder ratio" is meant the ratio between the quantity of water used for forming the mortar (including the water possibly contributed through the addition of aqueous additives) and the quantity of "binder" present, as defined previously, where the amount of water is the numerator and the amount of binder the denominator.

It is important to note that the mortars according to the present invention reach a high fluidity, without it being necessary to use large amounts of water; consequently, it is possible to obtain hardened end products with a high final mechanical resistance thanks to the particularly low water/binder ratio.

The mortars according to the invention may be produced through any process that envisages mixing of their components: processes and apparatus commonly in use for the formation of cementitious mortars may be employed. The temperature at which mixing with water of the dry composition occurs is generally comprised between 5° C. and the 35° C.

Useful applications for the mortars according to the invention are the ones envisaged for known pourable mortars, where the present invention affords the advantage of an improved fluidity and of high final resistance. Examples of such uses are the recovery of deteriorated building works, consolidation of rock formations, structural reinforcement, injection in the conduits of tendons, immobilization of material of toxic-noxious refuse (e.g., asbestos), and the production of cementitious products for pouring in moulds. Particular utility may be noted in the case of recovery of deteriorated building works, where the high final mechanical resistance of the mortar is most appreciated. Another particularly favoured sector is that of the formation of cementitious products by means of moulds. In this case, the high degree of fluidity of the mortar enables the fluid mass to reach homogeneously all the interstices that the particular shape envisages, thus producing products that are precise in shape, even in the case of complex and tortuous shapes. At the same time, the high final mechanical resistance enables the construction of thin-walled elements. A specific technology of moulding of cementitious products usefully improved by the present invention is the one described in the patent No. WO03008166, incorporated herein for reference. According to said process the plants for foundry moulds are fed with mortar in the fresh state. After solidification in the mould, the product is extracted and the moulds are re-used for a new casting. These plants, usually designed for the casting of molten metal, do not envisage the application of vibrations for compacting the casting mass, and consequently complete filling of the moulds, and compacting of the cementitious mix must be entrusted only to the characteristics of fluidity of the mortar. Current technology of casting in earth moulds envisages two different modalities of casting: 1. open moulding; 2. using a sprue. In the first case the mould consists of just one element having a face completely open and facing upwards. In the second case, instead, the mould is made up of two halves fitted together, and the material must flow through a sprue to be able to fill the mould. In both cases it is necessary for the mortar to have a high capacity for compacting only on account of its weight. It is likewise useful that, for products which are required to present particular mechanical performance, the mortar, once poured into the moulds, should solidify, developing high final resistance. All these results are usefully achieved by the present invention.

The present invention also includes new cementitious products, obtained starting from the new cementitious compositions described above. Said products are characterized in that they contain the hydraulic binder, the setting regulator, the finely ground slag, and the fractions of aggregates A, B, C, D as defined above, and possess excellent mechanical properties. Further subjects of the invention are:

(i) a dry premix obtainable by mixing together the hydraulic binder, the finely ground slag, the fludifier/superfluidifier, the setting regulator, and the fractions of aggregates A, B, C, D, as defined above.

(ii) A pourable mortar with high fluidity and high development of resistance, obtainable by mixing together water, the hydraulic binder, the finely ground slag, the fludifier/superfluidifier, the setting regulator, and the fractions of aggregates A, B, C, D as defined above.

The invention will now be described by means of the following non-limiting examples.

EXPERIMENTAL PART

Characteristics of Known Pourable Mortars

Reference is made to the following widely used pourable mortars:

MC1. mortar with a base of MACFLOW (RHEOMAC 200)-MAC S.p.A.;

MC2. MAPEGROUT COLABILE-MAPEI S.p.A.;

MC3. MALTA ANTIRITIRO REOPLASTICA AUTOLIVELLANTE (SELF-LEVELLING RHEOPLASTIC ANTI-SHRINK MORTAR)-SIRIOBETON A.C.

The mortars referred to above are specifically designed for providing high mechanical resistance, together with characteristics of good pourablity. Table 2 below summarizes the performance declared in the technical sheets of the products. In particular, for the binder MC1 the performance for two different compositions is given:

MC1-A) performance declared in paste (mix consisting of binder and water characterized by a water/binder ratio=0.32);

MC1-B) performance found in mortar (mix consisting of binder, aggregates proportioned according to Füller distribution and water; binder/aggregate ratio=1:1.25, water/binder ratio=0.38).

TABLE 1

Mechanical performance

| Product code | Time [days] | $R_{compression}$ [MPa] | $R_{flexure}$ [MPa] | Rheological characteristics |
|---|---|---|---|---|
| MC1-A (declared) | 1 | 20 | — | Enables very fluid and non-segregatable concretes with a low water/cement ratio to be obtained. |
| | 28 | 65 | — | |
| MC1-B (found) | 0.25 | not measurable | not measurable | Flow time (Marsh cone): 94 s |
| | 1 | 31.4 | 6.2 | |
| | 7 | 58.9 | 8.2 | |
| MC2 | 1 | 35.0 | 5.5 | High degree of fluidity, suitable for application by means of pouring in formwork, without segregation, even in large thicknesses. |
| | 7 | 60.0 | 8.0 | |
| | 28 | 75.0 | 10.0 | |
| MC3 | 7 | — | ≧4 | Pourable mortar for the renewal of concrete. |
| | 28 | ≧65 | — | |

Example 1

Comparison

Three reference compositions (referred to as "Mix 75, Mix 76, and Mix 77") were prepared containing an ordinary Portland cement, finely ground slag, and some additives used in cementitious compositions, such as, silica-smoke slurry, and superfluidifiers; the aggregates used in the three mixes were characterized by the granulometric distributions given in FIG. 1 and described hereinafter:

Mix 75: granulometric distribution obtained by combining four different fractions of aggregates, characterized by the parameters $X_0$ and n given in Table 2 below. The same table gives, for each fraction, the weight-percentage content referred to the mix of aggregate alone.

TABLE 2

Granulometric fractions used for the Mix 75

| | Fractions of aggregate | | | |
|---|---|---|---|---|
| | A | B | C | D |
| $x_0$ [mm] | 0.27 | 0.73 | 2.0 | 0.23 |
| n | 4.7 | 5.0 | 4.7 | 1.7 |
| $r^2$ | >0.99 | >0.99 | >0.99 | >0.99 |
| content in wt % of aggregate alone in the mix | 36.6 | 12.2 | 32.9 | 18.3 |

Also given in Table 2, as likewise in the ensuing tables, is the value of $r^2$ (determination index) for each fraction. Said value, which is always comprised between 0 and 1, is an index of the goodness of an interpolation of discrete data performed by means of a given function. In the specific case, it refers to the interpolation of the experimental data of grain size, performed using the RRSB equation. Its value, which is close to 1, indicates the excellent agreement between said equation and the granulometrical curves considered.

The dimensional ratios between the values of $X_0$ of A, B, C, and the index n of monogranularity for the fractions A, B, C, D are in accordance with the present invention; however, unlike the compositions claimed, Fraction A is present in an amount lower than 40 wt % with respect to the total of the aggregates.

Mix 76: granulometric distribution obtained by combining four different fractions of aggregates, characterized by the parameters $X_0$ and n given in Table 3 below. The same table gives, for each fraction, the weight-percentage content referred to the mix of aggregate alone.

TABLE 3

Granulometric fractions used for the Mix 76.

| | Fractions of aggregate | | | |
|---|---|---|---|---|
| | A | B | C | D |
| $x_0$ [mm] | 0.27 | 0.73 | 2.0 | 0.23 |
| n | 4.7 | 5.0 | 4.7 | 1.7 |
| $r^2$ | >0.99 | >0.99 | >0.99 | >0.99 |
| content in wt % of aggregate alone in the mix | 15.4 | 15.4 | 34.6 | 34.6 |

The dimensional ratios between the values of $X_0$ of A, B, C, and the index n of monogranularity for the fractions A, B, C, D are in accordance with the invention; however, unlike the compositions claimed, Fraction A is present in an amount lower than 40 wt % with respect to the total aggregates, and the fraction D exceeds 25 wt % of the total aggregates.

Mix 77: granulometric distribution obtained by combining four different fractions of aggregates, characterized by the parameters $X_0$ and n given in Table 4 below. The same table gives, for each fraction, the weight-percentage content referred to the mix of aggregate alone.

TABLE 4

Granulometric fractions used for the Mix 77

| | Fractions of aggregate | | | |
|---|---|---|---|---|
| | A | B | C | D |
| $x_0$ [mm] | 0.73 | 0.97 | 2.0 | 0.23 |
| n | 5.0 | 3.5 | 4.7 | 1.7 |
| $r^2$ | >0.99 | >0.99 | >0.99 | >0.99 |
| content in wt % of aggregate alone in the mix | 6.0 | 10.7 | 17.9 | 65.4 |

In this case the dimensional ratios between the values of $X_0$ of A, B, C, the index n of monogranularity of the fraction B, and the percentage incidence of Fractions A and D are not in accordance with the invention.

The aforesaid compositions Mix 75, Mix 76, and Mix 77 were mixed with water so as to obtain mortars with water/cement ratios in the region of 0.29-0.31. For each mortar, there were measured, in the fresh state, the volumic mass and the flow time, the latter factor being indicative of the fluidity and measured according to what is specified in what follows.

The mortar, immediately after its preparation, was poured (approximately 1.1 litres) into a metal cone in compliance with the standard UNI EN 445 (Marsh cone). There was then found the flow time of a known and pre-set volume (nominally, 1 litre) of mortar through the nozzle set in a position corresponding to the vertex of the cone.

The mortars were then poured to form prisms having dimensions of 40×40×160 mm and in conformance with the standard UNI EN 196-1 (WITHOUT SETTLING). The mortar was kept in the moulds located in a climatized environment (T=20±2° C.; RH=50±5 wt %) up to removal from the moulds after 24 hours from casting. Some specimens were then subjected to testing for resistance to compression, whilst the remaining specimens were kept in water at 20±2° C. for conducting resistance-to-compression tests for longer expiration times. On the same specimens there was then measured the development of resistance to compression at 24 hours, and at 7 and 28 days. The results are set forth in Table 5 below.

TABLE 5

|  | Mix 75 | Mix 76 | Mix 77 |
|---|---|---|---|
| CEM I 52.5 R [%] | 25.1 | 25.7 | 29.4 |
| Silica-smoke slurry (dry substance) [%] | 1.5 | 1.5 | 1.6 |
| Slag [%] | 13.3 | 13.6 | 5.6 |
| Aggregates (Table 2) [%] | 48.4 | 47.1 | 52.0 |
| Water [%] | 11.6 | 11.9 | 11.3 |
| Acrylic superfluidifier (dry substance) [%] | 0.20 | 0.20 | 0.20 |
| Water/binder ratio | 0.29 | 0.29 | 0.31 |
| Volumic mass [kg/m$^3$] | 2260 | 2262 | 2233 |
| Flow time [s] | 95 | 106 | 89 |
| Resistance to compress. [MPa]: 24 h | 10.6 | 27.8 | 68.4 |
| Resistance to compress. [MPa]: 7 d | 56.4 | 71.8 | 71.5 |
| Resistance to compress. [MPa]: 28 d | 57.3 | 73.6 | 74.8 |
| Resistance to flexure [MPa]: 24 h | 2.8 | 6.8 | 6.4 |
| Resistance to flexure [MPa]: 7 d | 8.2 | 9.1 | 9.2 |
| Resistance to flexure [MPa]: 28 d | 8.3 | 10.2 | 10.3 |

The compositions of Table 5 were defined so as to minimize the viscosity of the mixes, and consequently the flow times, and at the same time limit any possible phenomena of segregation. In any case, it may be noted that the flow time (89-106 s) was decidedly unsatisfactory. The final mechanical resistance (at 28 days) to compression and to flexure yield results substantially comparable with the ones given in Table 1 for known products.

Example 2

A mortar was prepared in accordance with the present invention (referred to herein as "MBVS") using amounts of ingredients equivalent to the ones used in the reference examples; however, in this case the parameters $X_0$, n, and the percentage incidence of the various fractions A, B, C, D were in accordance with the present invention. In particular, an aggregate was used obtained for 90 wt % by mixing three distinct fractions of aggregate, designated in FIG. 2 with the letters A, B and C, and such as to satisfy the requisites illustrated previously.

Table 6 gives the granulometric distribution of the three fractions A, B and C.

TABLE 6

| Diameter [mm] | A | B | C |
|---|---|---|---|
| 3.15 | 100.0 | 100.0 | 100.0 |
| 2.00 | 100.0 | 100.0 | 63.2 |
| 1.6 | 100.0 | 100.0 | 30.6 |
| 1.0 | 100.0 | 99.3 | 2.1 |
| 0.5 | 100.0 | 13.5 | 1.2 |
| 0.25 | 49.4 | 1.4 | 0.7 |
| 0.2 | 21.1 | 1.1 | 0.5 |
| 0.125 | 3.1 | 0.7 | 0.2 |
| 0.075 | 0.8 | 0.4 | 0.1 |
| 0.051 | 0.0 | 0.0 | 0.0 |

Figure 2:
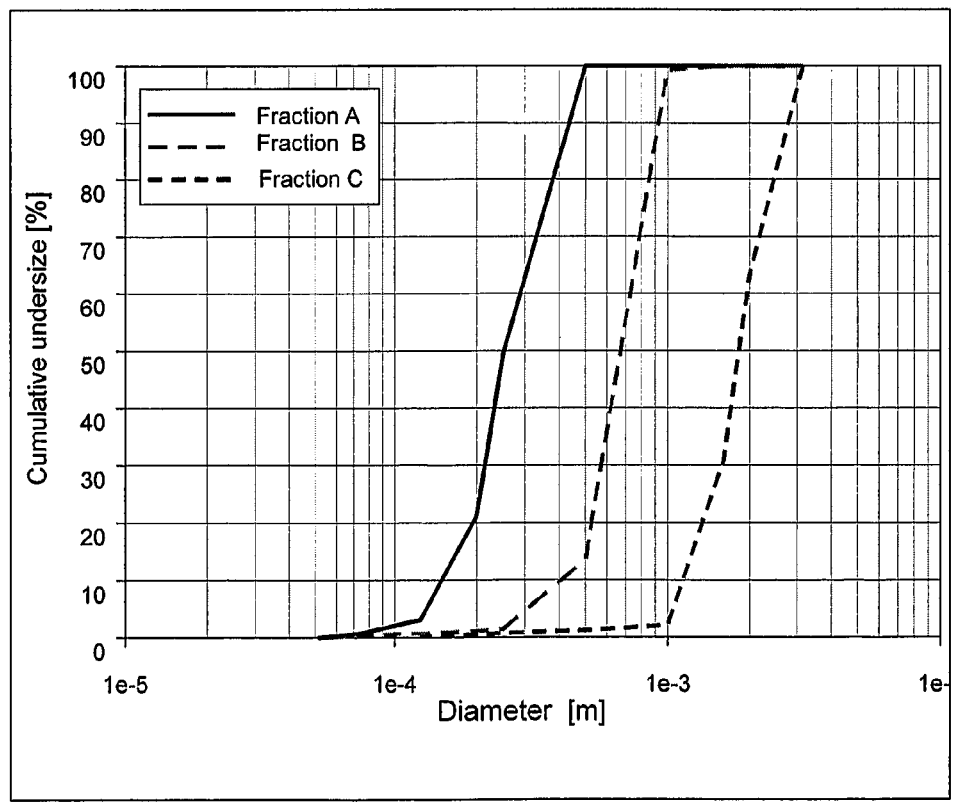
FIG. 2: fractions of aggregate used in Example 2 (subject of the invention)

Table 7 gives the characteristic parameters of the curves of granulometric distribution illustrated in FIG. 2. The same table gives, for each fraction, the percentage content referred to the mix of aggregate alone.

TABLE 7

|  | Fraction | | | |
|---|---|---|---|---|
|  | A | B | C | D |
| $x_0$ | 0.27 | 0.73 | 2.00 | 0.23 |
| n | 4.7 | 5.0 | 4.7 | 1.7 |
| r$^2$ | >0.99 | >0.99 | >0.99 | >0.99 |
| content in wt % of aggregate alone in the mix | 56.7 | 13.3 | 20.0 | 10.0 |

From an analysis of Table 7 it may be noted that the three fractions A, B, and C are characterized by a value of the parameter n>4.0, which confirms the substantial monogranularity of the distributions. The characteristic grain diameters for the two distributions are respectively equal to 0.27 mm, 0.73 mm, and 2.00 mm. The ratios between the characteristic grain diameters of the two distributions are:

$$X_{OC}/X_{OB}=2.74$$

$$X_{OB}/X_{OA}=2.70$$

The composition data, the values of volumic mass, of fluidity of the mortar (expressed in terms of flow time through the Marsh cone), and the values of resistance of the product in the hardened state are set forth in Table 8 below.

TABLE 8

|  | MBVS | |
|---|---|---|
| CEM I 52.5 R | [%] | 33.4 |
| Silica-smoke slurry (dry substance) | [%] | 1.5 |
| Slag | [%] | 8.7 |
| Aggregate | [%] | 43.6 |
| Water | [%] | 12.6 |
| Acrylic superfluidifier (dry substance) | [%] | 0.17 |
| Water/binder ratio |  | 0.29 |
| Volumic mass | [kg/m$^3$] | 2276 |
| Flow time | [s] | 60 |
| Resistance to compression | [MPa] | 24 h 34.0 |
|  |  | 48 h 58.0 |
|  |  | 7 d 93.7 |
|  |  | 28 d 104.9 |
| Resistance to flexure | [MPa] | 48 h 10.7 |
|  |  | 7 d 17.9 |
|  |  | 28 d 15.8 |

As emerges from Table 8, the flow time (60 s, indicating a high degree of fluidity) was completely different from and lower than those measured for the reference compositions (89-106 s). There was thus obtained a considerably higher fluidity with respect to the reference compositions illustrated in Table 5. Apart from the different grain size of the aggregates, the various compositions tested were substantially equivalent from the qualitative and quantitative standpoints. In particular, the water/cement ratio used was kept in the region of 0.29-0.31, and the amounts of superfluidifiers were kept in the region of 0.2%. The marked increases in fluidity of the mortar were thus a consequence of the modifications made in the grain size of the aggregates. It may moreover be noted that to said substantial increase in fluidity there corresponds a considerable increase in the mechanical resistance both to compression and to flexure. The development of resistance up to high final values is of primary importance for the purpose of solving the problems addressed by the present invention and widely discussed in the foregoing detailed description.

The values of fluidity observed for the mortar MBVS are compatible with its use for forming homogeneous products in foundry moulds, without any application of vibration for settling the mass.

When subjected to freezing/thawing tests (according to UNI 7087), the products presented, after 300 cycles, a factor of degradation approaching 1.0, which indicates a good resistance to freezing Example 3

The mortar of Example 2 was used for producing cementitious products by means of pouring in moulds in foundry earth, in an industrial plant normally used for the moulding of metal products.

The apparatus (Disamatic manufactured by Disa Industries, Herlev DK) has a maximum rate of production of 480 pieces/hour. The time necessary for filling the moulds with the mortar was very similar to the time employed in the case of the casting of molten metal; the filling of the moulds was homogeneous. The characteristics of the products produced were the following:

Tube (length 500 mm, thickness 11 mm), weight 10 kg

Tube bent at 90°, weight 10 kg

The invention claimed is:

1. A dry premix for preparing a pourable mortar with a high degree of fluidity comprising a hydraulic binder, finely ground slag, a fluidifier and/or superfluidifier, a setting regulator, and aggregates, wherein:
   (i) 75-95 wt % of the aggregates are made of three monogranular fractions A, B, C, having a characteristic grain diameter increasing progressively from A to B to C;
   (ii) the ratio between the characteristic grain diameters of the fractions C and B is comprised between 2.2 and 3.2;
   (iii) the ratio between the characteristic grain diameters of the fractions B and A is comprised between 2.2 and 3.2;
   (iv) the remaining 5-25 wt % portion of aggregates consists of a fourth fraction D having a lower monogranularity than fractions A, B, C, and a characteristic grain diameter not lower than 0.1 mm; and
   (v) fraction A consists of at least 40 wt % of the total aggregates in the dry premix.

2. The premix according to claim 1, where the ratio between the characteristic grain diameters of the fractions C/B and/or B/A is comprised between 2.5 and 3.0.

3. The premix according to claim 1, wherein the fractions A, B, C represent 85-92 wt % of the total aggregates, and the fraction D represents 8-15 wt % of the total aggregates.

4. The premix according to claim 1, wherein the division in weight percentage of the three fractions A, B, C, with respect to their sum, is the following:
   Fraction A: 50 wt %-70 wt %;
   Fraction B: 10 wt %-20 wt %;
   Fraction C: 18 wt %-32 wt %.

5. The premix according to claim 1, wherein the division in weight percentage of the three fractions A, B, C, with respect to their sum, is the following:
   Fraction A: 55 wt %-65 wt %;
   Fraction B: 12 wt %-18 wt %;
   Fraction C: 21 wt %-29 wt %.

6. The premix according to claim 1, wherein the characteristic grain diameter $X_0$ of the different fractions of aggregates is the following:
   Fraction A: 0.2-0.4 mm;
   Fraction B: 0.6-0.8 mm;
   Fraction C: 1.6-2.4 mm;
   Fraction D: 0.1-0.3 mm.

7. The premix according to claim 1, where the aggregates as a whole represent from 40 wt % to 60 wt % of the dry premix.

8. The premix according to claim 1, where the hydraulic binder is a Portland cement.

9. The premix according to claim 1, where the fluidifiers/superfluidifiers are selected from the group consisting of melaminic, naphthalenic, and acrylic compounds.

10. The premix according to claim 1, where the setting regulators are citric acid, boric acid, and tartaric acid.

11. A pourable cementitious mortar comprising water, a hydraulic binder, finely ground slag, a fluidifier and/or superfluidifier, a setting regulator, and aggregates, characterized as follows:
    (i) the aggregates are made up, for 75-95 wt %, of three highly monogranular fractions A, B, C having a characteristic grain diameter increasing progressively from A to B to C;
    (ii) the ratio between the characteristic grain diameters of the fractions C and B is comprised between 2.2 and 3.2;
    (iii) the ratio between the characteristic grain diameters of the fractions B and A is comprised between 2.2 and 3.2;
    (iv) the remaining 5-25 wt % portion of aggregates consists of a fourth fraction D having a lower monogranularity than fractions A, B, C; and
    (v) fraction A represents at least 40 wt % of the total aggregates present in the mortar.

12. A method of using a pourable mortar comprising water, a hydraulic binder, finely ground slag, a fluidifier and/or superfluidifier, a setting regulator, and aggregates, characterized as follows:
    (i) the aggregates are made up, for 75-95 wt %, of three highly monogranular fractions A, B, C having a characteristic grain diameter increasing progressively from A to B to C;
    (ii) the ratio between the characteristic grain diameters of the fractions C and B is comprised between 2.2 and 3.2;
    (iii) the ratio between the characteristic grain diameters of the fractions B and A is comprised between 2.2 and 3.2;
    (iv) the remaining 5-25 wt % portion of aggregates consists of a fourth fraction D having a lower monogranularity than fractions A, B, C; and
    (v) fraction A represents at least 40 wt % of the total aggregates present in the mortar, for applications in the cement sector.

13. The method according to claim 12, for the recovery of deteriorated building works, consolidation of rock formations, structural reinforcement, injection in the conduits of tendons, immobilization of toxic-noxious refuse, and in the production of cementitious products by means of pouring in moulds.

14. The method according to claim 13, in which said moulds are foundry earth moulds.

15. A process for preparing a pourable mortar with a high degree of fluidity, said process comprising mixing together water and a hydraulic binder, finely ground slag, a fluidifier and/or superfluidifier, a setting regulator, and aggregates characterized as follows:
    (i) the aggregates are made up, for 75-95 wt %, of three highly monogranular fractions A, B, C, having a characteristic grain diameter increasing progressively from A to B to C;
    (ii) the ratio between the characteristic grain diameters of the fractions C and B is comprised between 2.2 and 3.2;

(iii) the ratio between the characteristic grain diameters of the fractions B and A is comprised between 2.2 and 3.2;

(iv) the remaining 5-25 wt % portion of aggregates consists of a fourth fraction D having a lower monogranularity than fractions A, B, C; and (v) fraction A represents at least 40 wt % of the total aggregates present in the dry premix.

16. The process for preparing cementitious products, characterized by pouring and solidifying in appropriate moulds a mortar according to claim 11.

17. A cementitious product obtainable by means of the process described in claim 15.

18. The cementitious product comprising a hydraulic binder, finely ground slag, a fluidifier and/or superfluidifier, a setting regulator, and aggregates characterized as follows:

(i) the aggregates are made up, for 75-95 wt %, of three highly monogranular fractions A, B, C, having a characteristic grain diameter increasing progressively from A to B to C;

(ii) the ratio between the characteristic grain diameters of the fractions C and B is comprised between 2.2 and 3.2;

(iii) the ratio between the characteristic grain diameters of the fractions B and A is comprised between 2.2 and 3.2;

(iv) the remaining 5-25 wt % portion of aggregates consists of a fourth fraction D having a lower monogranularity than fractions A, B, C; and (v) fraction A represents at least 40 wt % of the total aggregates present in the dry premix.

19. A cementitious composition useful for preparing high-resistance cementitious products, obtainable by mixing together a hydraulic binder, finely ground slag, a fluidifier and/or superfluidifier, a setting regulator, and aggregates characterized as follows:

(i) the aggregates are made up, for 75-95 wt %, of three highly monogranular fractions A, B, C, having a characteristic grain diameter increasing progressively from A to B to C;

(ii) the ratio between the characteristic grain diameters of the fractions C and B is comprised between 2.2 and 3.2;

(iii) the ratio between the characteristic grain diameters of the fractions B and A is comprised between 2.2 and 3.2;

(iv) the remaining 5-25 wt % portion of aggregates consists of a fourth fraction D having a lower monogranularity than fractions A, B, C; and (v) fraction A represents at least 40 wt % of the total aggregates present in the dry premix.

* * * * *